: US 11,886,988 B2
(45) Date of Patent: Jan. 30, 2024

(54) METHOD FOR ADAPTIVE EXPLORATION TO ACCELERATE DEEP REINFORCEMENT LEARNING

(71) Applicant: INTERNATIONAL BUSINESS MACHINES CORPORATION, Armonk, NY (US)

(72) Inventor: Sakyasingha Dasgupta, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1460 days.

(21) Appl. No.: 15/820,768

(22) Filed: Nov. 22, 2017

(65) Prior Publication Data

US 2019/0156197 A1 May 23, 2019

(51) Int. Cl.
*G06N 3/08* (2023.01)
*G06N 7/01* (2023.01)

(52) U.S. Cl.
CPC .......... *G06N 3/08* (2013.01); *G06N 7/01* (2023.01)

(58) Field of Classification Search
CPC ............ G06N 3/08; G06N 3/04; G06N 3/063; G06N 3/082; G06N 20/00
USPC .......................................................... 706/25
See application file for complete search history.

(56) References Cited

U.S. PATENT DOCUMENTS

2016/0232445 A1  8/2016  Srinivasan et al.

FOREIGN PATENT DOCUMENTS

WO    20107/004626 A1    1/2017

OTHER PUBLICATIONS

Hosu et al.—"Playing Atari Games with Deep Reinforcement Learning and Human Checkpoint Replay"—2016—https://arxiv.org/pdf/1607.05077.pdf (Year: 2016).*
Reinforcement Learning (DQN) tutorial—PyTorch Tutorials documentation—Apr. 2017—https://web.archive.org/web/20170407171821/https://pytorch.org/tutorials/intermediate/reinforcement_q_learning.html (Year: 2017).*
Ruben Fiszel's website—Reinforcement Learning and DQN, learning to play from pixels—2016—https://web.archive.org/web/20160825004047/https://rubenfiszel.github.io/posts/rl4j/2016-08-24-Reinforcement-Learning-and-DQN.html (Year: 2016).*
Machine Learning for Humans, Part 5_ Reinforcement Learning—Aug. 2017—https://web.archive.org/web/20170821231454/https://medium.com/machine-learning-for-humans/reinforcement-learning-6eacf258b265 (Year: 2017).*

(Continued)

*Primary Examiner* — Viker A Lamardo
(74) *Attorney, Agent, or Firm* — Tutunjian & Bitetto, P.C.; Robert Richard Aragona

(57) ABSTRACT

Adaptive exploration in deep reinforcement learning may be performed by inputting a current time frame of an action and observation sequence sequentially into a function approximator, such as a deep neural network, including a plurality of parameters, the action and observation sequence including a plurality of time frames, each time frame including action values and observation values, approximating a value function using the function approximator based on the current time frame to acquire a current value, updating an action selection policy through exploration based on an ε-greedy strategy using the current value, and updating the plurality of parameters.

13 Claims, 7 Drawing Sheets

(56) References Cited

OTHER PUBLICATIONS

Stadie et al.—"Incentivizing Exploration in Reinforcement Learning With Deep Predictive Models"—2015—https://arxiv.org/pdf/1507.00814.pdf (Year: 2015).*

Carmel et al.—"Exploration Strategies for Model-based Learning in Multi-agent Systems"—1997—http://citeseerx.ist.psu.edu/viewdoc/summary?doi=10.1.1.43.7326 (Year: 1997).*

Michel Tokic—"Adaptive ϵ-greedy Exploration in Reinforcement Learning Based on Value Differences"—2010—https://www.researchgate.net/publication/221562563_Adaptive_e-Greedy_Exploration_in_Reinforcement_Learning_Based_on_Value_Differences (Year: 2010).*

Sledge et al.—"Using the Value of Information to Explore Stochastic, Discrete Multi-Armed Bandits"—Oct. 8, 2017—https://arxiv.org/pdf/1710.02869v1.pdf (Year: 2017).*

Velentzas et al.—"Bio-Inspired Meta-Learning for Active Exploration During Non-Stationary Multi-Armed Bandit Tasks"—Sep. 7-8, 2017—https://ieeexplore.ieee.org/stamp/stamp.jsp?tp=&arnumber=8324365 (Year: 2017).*

Khamassi et al.—"Active exploration in parameterized reinforcement learning"—2016—https://arxiv.org/pdf/1610.01986.pdf (Year: 2016).*

Ishii, S. et al., "Control of Exploitation-exploration meta-parameter in reinforcement learning" Neural Netw. (Apr. 2002) pp. 1-44.

Mnih, V. et al., "Playing Atari with Deep Reinforcement Learning" arXiv:1312.5602 (Dec. 2013) pp. 1-9.

Firoiu, V. et al., "Beating the World's Best at Super Smash Bros. Melee with Deep Reinforcement Learning" arXiv:1702.06230 (May 2017) pp. 1-11.

Thrun, S.B., "Efficient Exploration in Reinforcement Learning" Technical Report Efficient Exploration In Reinforcement Learning (Jan. 2002) pp. 1-44.

Minh, V. et al., "Human-level control through deep reinforcement learning" Nature (Feb. 2015) pp. 1-13, vol. 518.

\* cited by examiner

US 11,886,988 B2

METHOD FOR ADAPTIVE EXPLORATION TO ACCELERATE DEEP REINFORCEMENT LEARNING

TECHNICAL FIELD

The present invention relates to reinforcement learning. More specifically, the present invention relates to adapting an exploration term during deep reinforcement learning.

BACKGROUND

Deep reinforcement learning techniques like DQN and variants thereof require a large amount of trial and error (i.e., repetitive exploration of the different environment states) in order to learn optimal actions that can maximize a given reward function. However, the learning time and the final solution is very sensitive to an exploration term. Typically, this exploration term is either fixed or annealed over time using some ad hoc mechanism with a Boltzmann exploration term.

SUMMARY

According to an aspect of the present invention, provided is a computer program product including one or more computer readable storage mediums collectively storing program instructions that are executable by a computer to cause the computer to perform operations including inputting a current time frame of an action and observation sequence sequentially into a function approximator, such as a deep neural network, including a plurality of parameters, the action and observation sequence including a plurality of time frames, each time frame including action values and observation values, approximating a value function using the function approximator based on the current time frame to acquire a current value, updating an action selection policy through exploration based on an ε-greedy strategy using the current value, and updating the plurality of parameters.

This aspect may also include the method performed by the processor executing the instructions of the computer program product, and an apparatus that performs the method.

The summary clause does not necessarily describe all necessary features of the embodiments of the present invention. The present invention may also be a sub-combination of the features described above.

DESCRIPTION OF EXEMPLARY EMBODIMENTS

Hereinafter, example embodiments of the present invention will be described. The example embodiments shall not limit the invention according to the claims, and the combinations of the features described in the embodiments are not necessarily essential to the invention.

Deep reinforcement learning refers to multi-layered neural networks that utilize deep learning within the reinforcement learning framework, and may be useful in reward-based machine learning, such as for control applications.

Embodiments of the present invention may adaptively change the exploration term ($\varepsilon$) of an $\varepsilon$-greedy policy with dependence on the continuous performance of a function approximator, such as a deep neural network, using an information theoretic mechanism that can learn an inverse temperature parameter ($\beta$) over time with gradient decent. This adaptive change may lead to accelerated learning and a better solution over time.

Figure 1:
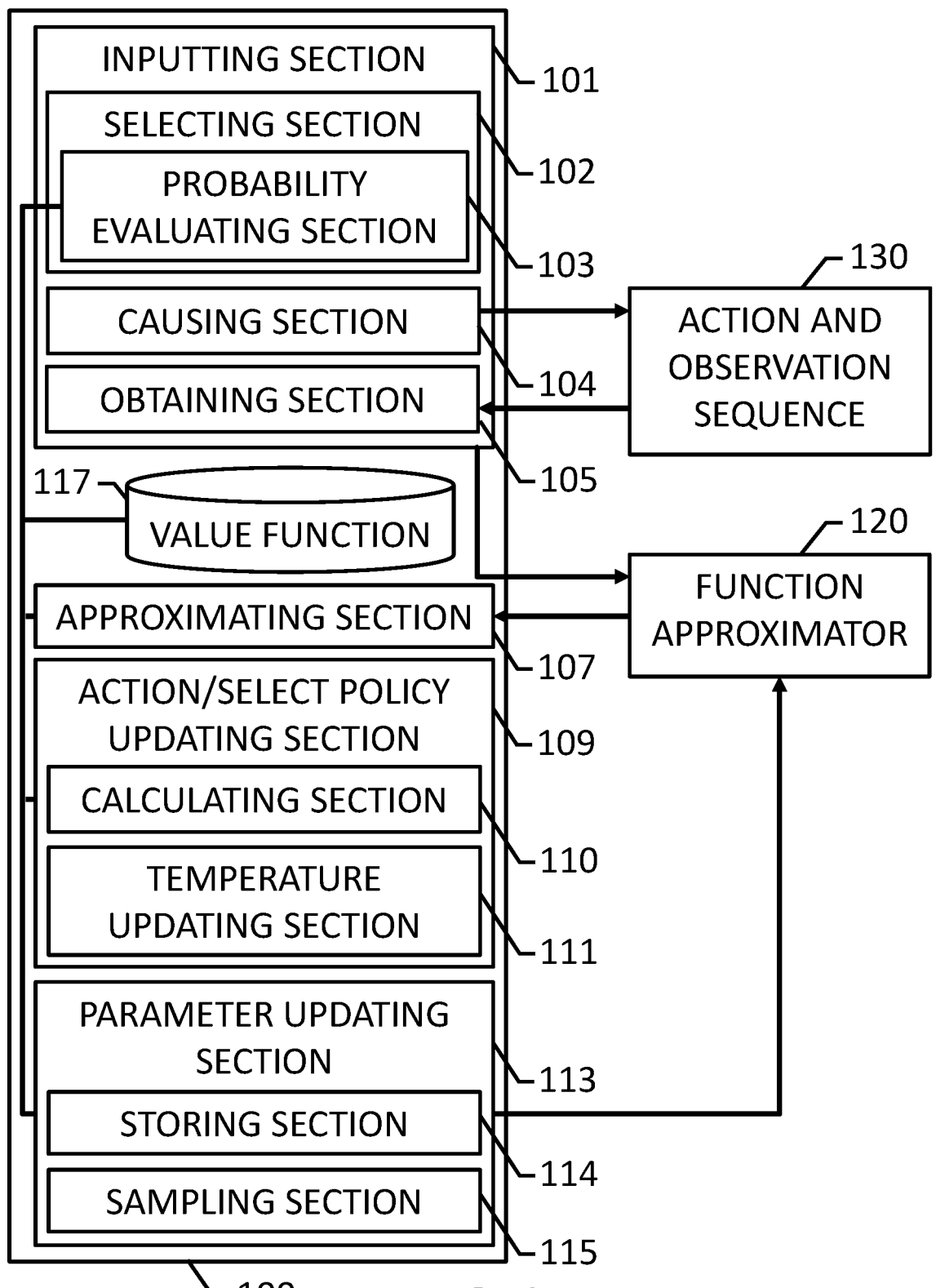
FIG. 1 shows an apparatus for adaptive exploration in deep reinforcement learning, according to an embodiment of the present invention.

FIG. 1 shows an apparatus for adaptive exploration in deep reinforcement learning, according to an embodiment of the present invention. Apparatus 100 may be a host computer such as a server computer or a mainframe computer that executes an on-premise application and hosts client computers that use it. Apparatus 100 may be a computer system that includes two or more computers. Alternatively, apparatus 100 may be a personal computer that executes an application for a user of apparatus 100. Apparatus 100 may perform adaptive exploration in deep reinforcement learning.

Apparatus 100 may include an inputting section 101, which may include a selecting section 102 including a probability evaluating section 103, a causing section 104, and an obtaining section 105, an approximating section 107, an action selection policy updating section 109, which may include a calculating section 110 and a temperature updating section 111, and a parameter updating section 113, which may include a storing section 114 and a sampling section 115. Apparatus 100 may be a computer program product including one or more computer readable storage mediums collectively storing program instructions that are executable by a processor or programmable circuitry to cause the processor or programmable circuitry to perform the operations of the various sections. Apparatus 100 may alternatively be analog or digital programmable circuitry, or any combination thereof. Apparatus 100 may alternatively be a computer on which the computer program product is installed. Apparatus 100 may be composed of physically separated storage or circuitry that interacts through communication.

Apparatus 100 may interact with action and observation sequences 130, which may include a person, a machine, or other object subject to modeling as a decision process. The observations may be obtained through sensors, and actions may be caused through instructions or physical interaction.

Action and observation sequence 130 may be represented by a computer program, such as a game, which is bound by a digitally created environment. Such a computer program may be observed by receiving data output from the program, and actions may be caused by issuing commands to be executed by the computer program.

Inputting section 101 may input values into a function approximator, such as function approximator 120. For example, inputting section 101 may be configured to input a current time frame of action and observation sequence 130 sequentially into function approximator 120, which includes a plurality of parameters, action and observation sequence 130 including a plurality of time frames, each time frame including action values and observation values.

Selecting section 102 may select actions from among a plurality of possible actions. For example, selecting section 102 may be configured to select an action according to an action selection policy with which to proceed from a current time frame of action and observation sequence 130 to a subsequent time frame of action and observation sequence 130.

Probability evaluating section 103 may evaluate reward probabilities of actions. For example, probability evaluating section 103 may be configured to evaluate each reward probability of a plurality of possible actions according to a probability function based on a value function, such as value function 117.

Causing section 104 may cause actions to be performed. For example, causing section 104 may be configured to cause the selected action to be performed, such as the action selected by selecting section 102.

Obtaining section 105 may obtain observations. For example, obtaining section 105 may be configured to obtain an observation of the subsequent time frame of action and observation sequence 130.

Approximating section 107 may approximate value functions, such as value function 117. For example, approximating section 107 may be configured to approximate value function 117 using function approximator 120 based on the current time frame to acquire a current value. In some embodiments, value function 117 may be an action-value function.

Action selection policy updating section 109 may update action selection policies. For example, action selection policy updating section 109 may be configured to update an action selection policy through exploration based on an ε-greedy strategy using the current value.

Calculating section 110 may calculate exploration terms. For example, calculating section 110 may be configured to calculate an exploration term based on the current value and a temperature parameter.

Temperature updating section 111 may update temperature parameters. For example, temperature updating section 111 may be configured to update the temperature parameter using the exploration term and the current value.

Parameter updating section 113 may update parameters. For example, parameter updating section 113 may be configured to update the plurality of parameters of function approximator 120.

Storing section 114 may store experiences. For example, storing section 114 may be configured to store at least one experience in a replay memory, each experience including action values, observation values, and reward values of a previous time frame and observation values of a current time frame.

Sampling section 115 may sample experience transitions. For example, sampling section 115 may be configured to sampling at least one experience transition, each experience transition including two consecutive experiences.

Figure 2:
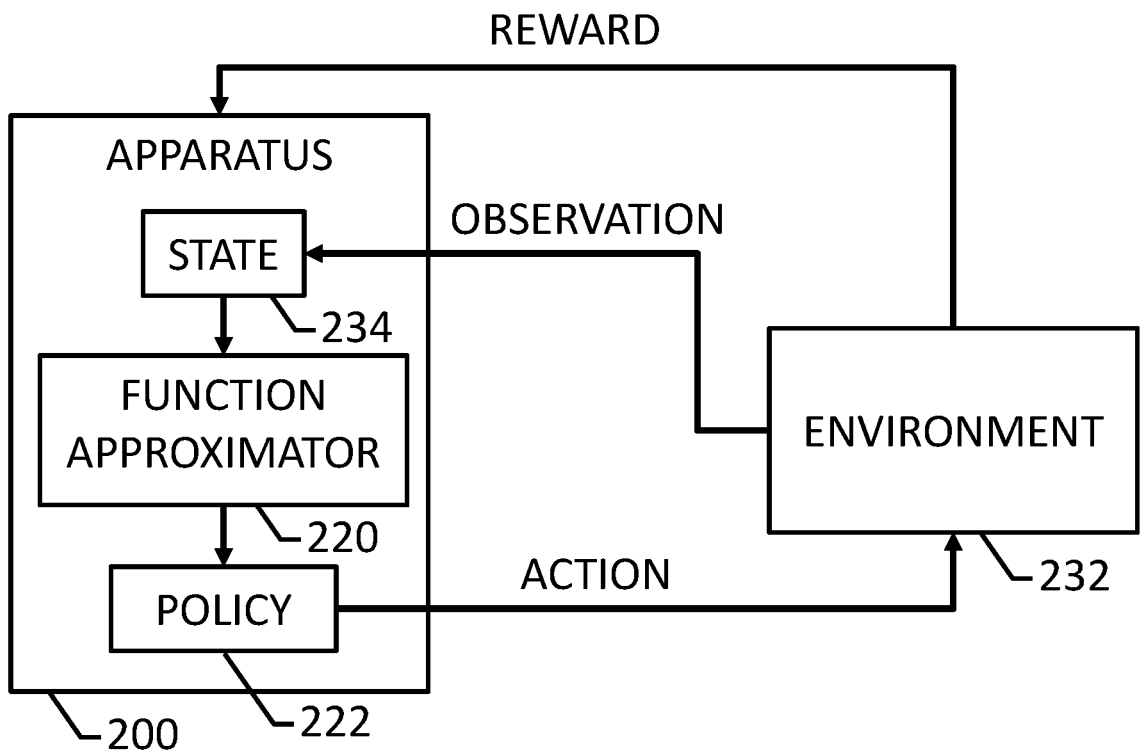
FIG. 2 shows a diagram of the interaction between an apparatus for adaptive exploration in deep reinforcement learning and an environment, according to an embodiment of the present invention.

FIG. 2 shows a diagram of the interaction between an apparatus 200 for adaptive exploration in deep reinforcement learning and an environment 232, according to an embodiment of the present invention. The diagram includes apparatus 200, which continuously observes a state 234 of environment 232, receives reward information concerning the actions performed in environment 232, feeds state 234 into a function approximator 220, and determines actions to be performed in environment 232 using an action selection policy 222. In some embodiments, the environment may be a computer program, such as a game, and as such environment 232 may be entirely digitally created. Such a computer program may be observed by receiving data output from the program, and actions may be caused by issuing commands to be executed by the computer program. Function approximator 220 may be a neural network, such as a deep neural network (DNN), including Deep Q-Networks (DQNs), or any other type of neural network capable of function approximation.

Function approximator 220 may be an algorithm from which a numerical output can be derived from a numerical input. The algorithm of function approximator 220 includes weights, or constants, which are adapted, through a process of learning, to provide accurate output in view of the type of input and the purpose of the algorithm. The size of the algorithm may vary with the numerical size of the input and output, and the complexity of the purpose of the algorithm. In the case of a neural network, the number of nodes may correspond to the size of the input and output, and the number of layers may be increased as the complexity of the purpose increases. Although in many embodiments of function approximators, the weights, or constants, begin as a random selection, the following disclosure will further explain the learning process.

For example, in a game of PACMAN™, the observations may be the video and/or audio output that a gamer would normally see and hear while playing the game, the actions may be the directional input that a gamer would normally input into a gamepad or joystick to steer the PACMAN™ character, and the rewards may be the score, the number of lives, or anything else indicative of a successful maneuver as opposed to a failed maneuver. In this example, apparatus 200 may essentially play the role of the gamer, by observing the game's output and determining the input required to play as well as possible.

In some embodiments, using the PACMAN™ example, apparatus 200 may be designed to physically take the place of a gamer. In other words, the PACMAN™ game environment would consist of a television and a game controller, and apparatus 200 would consist of a video image sensor and microphone to capture the television's output, and a system of actuators operable to depress the individual buttons of the game controller. In other embodiments, using the PACMAN™ example, apparatus 200 may be designed to run in the same operating system as the PACMAN™ game, which may allow the exchange of input and output between the game and the apparatus to happen purely digitally.

Figure 3:
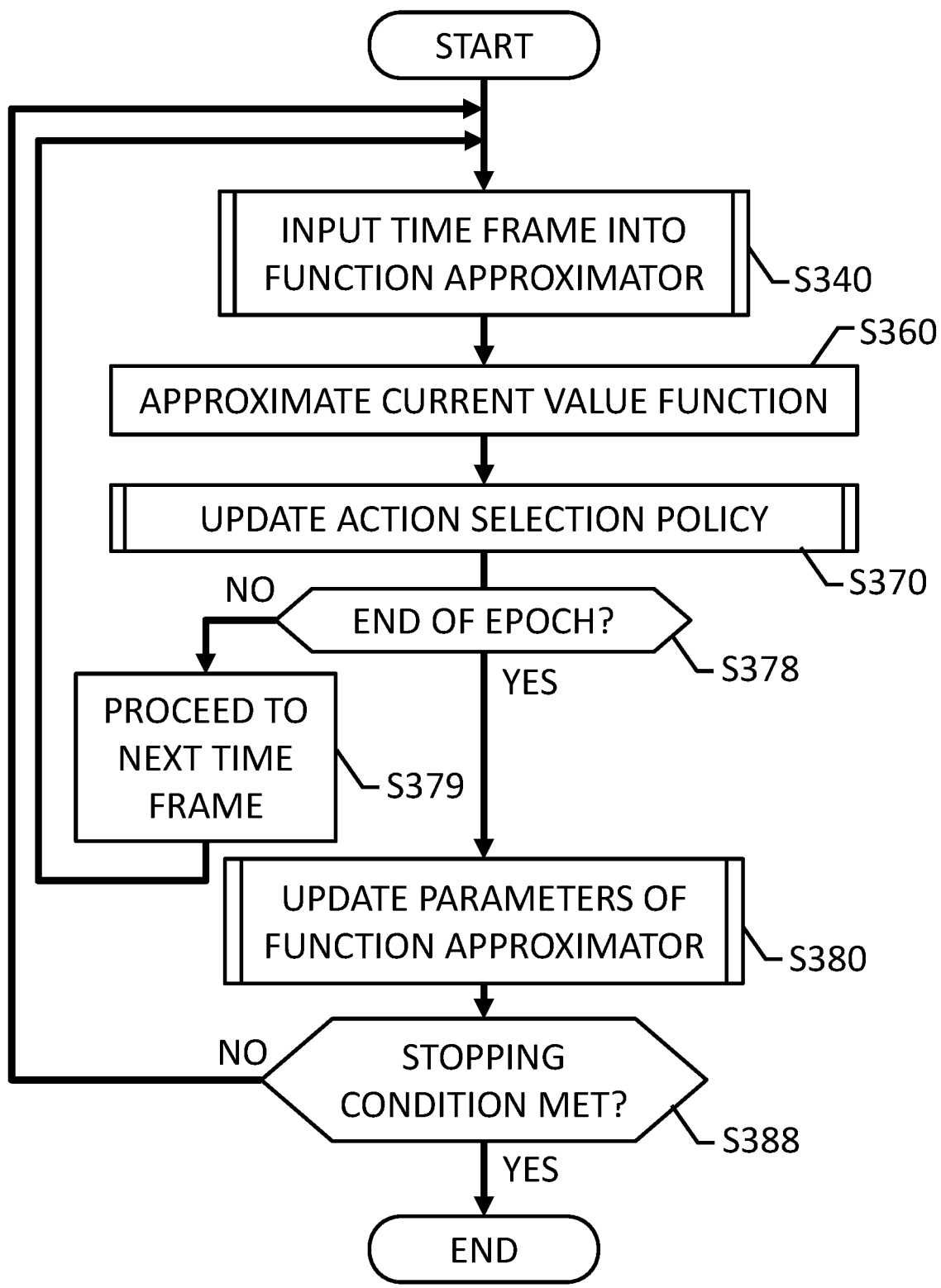
FIG. 3 shows an operational flow for adaptive exploration in deep reinforcement learning, according to an embodiment of the present invention.

FIG. 3 shows an operational flow for adaptive exploration in deep reinforcement learning, according to an embodiment of the present invention. The operational flow may provide a method of adaptive exploration in deep reinforcement learning. The operations may be performed by an apparatus, such as apparatus 100.

At S340, an inputting section, such as inputting section 101, may input a current time frame of an action and observation sequence, such as action and observation sequence 130, sequentially into a function approximator, such as function approximator 120, which includes a plurality of parameters, the action and observation sequence including a plurality of time frames, each time frame including action values and observation values.

At S360, an approximating section, such as approximating section 107, may approximate a value function, such as value function 117, using the function approximator based on the current time frame to acquire a current value. In some embodiments, the approximation of the value function by the approximating section may include acquiring the current value from an evaluation of the value function in consideration of an actual reward.

At S370, an action selection policy updating section, such as action selection policy updating section 109, may update an action selection policy. For example, the action selection policy updating section may update an action selection policy through exploration based on an ε-greedy strategy using the current value. In some embodiments, the action selection policy may appear as:

$$\pi(s) = \begin{cases} \text{random action from } A(s) & \text{if } \xi < \varepsilon \\ \text{argmax}_{a \in A(s)} Q(s, a) & \text{otherwise} \end{cases} \quad \text{Eq. (1)}$$

Where $0 \geq \xi \leq 1$.

Although the exploration term is typically a hyper-parameter, the action selection policy updating section may make the exploration term learnable. In some embodiments, the exploration term may be bound by a policy that makes the exploration greater at the beginning, and decreases the exploration term as the reward approaches maximum. In some embodiments in which the function approximator is a DQN, the action selection policy updating section may continuously adapt the ε-greedy exploration term for neural network based reinforcement learning, with dependence on the value function approximated by the neural network.

At S378, the apparatus may determine whether it is the end of an epoch. If the end of an epoch has been reached, such as if a designated number of iterations have been performed, then the operational flow proceeds to S380. If the end of an epoch has not been reached, such as if a designated number of iterations have not yet been performed, then the operational flow proceeds to S379.

At S379, the apparatus proceeds to the next time frame, and the operational flow returns to operation S340 to perform the next iteration. In the next iteration, the current time frame becomes a previous time frame, and the subsequent time frame becomes the current time frame.

At S380, a parameter updating section, such as parameter updating section 113, may update the plurality of parameters of the function approximator. In some embodiments where the function approximator is a DQN, the parameters may be updated according to a Temporal Difference (TD) error.

At S388, the apparatus may determine whether a stopping condition is met. If the stopping condition is met, such as if a maximum number of iterations have been performed, then the operational flow is discontinued. If the stopping condition is not met, such as if a maximum number of iterations have not yet been performed, then the operational flow returns to S340.

In some embodiments, the operational flow for adaptive exploration in deep reinforcement learning may begin by initializing a replay memory, the exploration term, the inverse temperature parameter, a value function or action-value function Q with random weights, and by making an initial observation. In many embodiments, the exploration term is initialized such that exploration is high, because as the exploration term is learned over time the exploration term will be modified such that the exploration is lowered, meaning that exploitation is raised.

Figure 4:
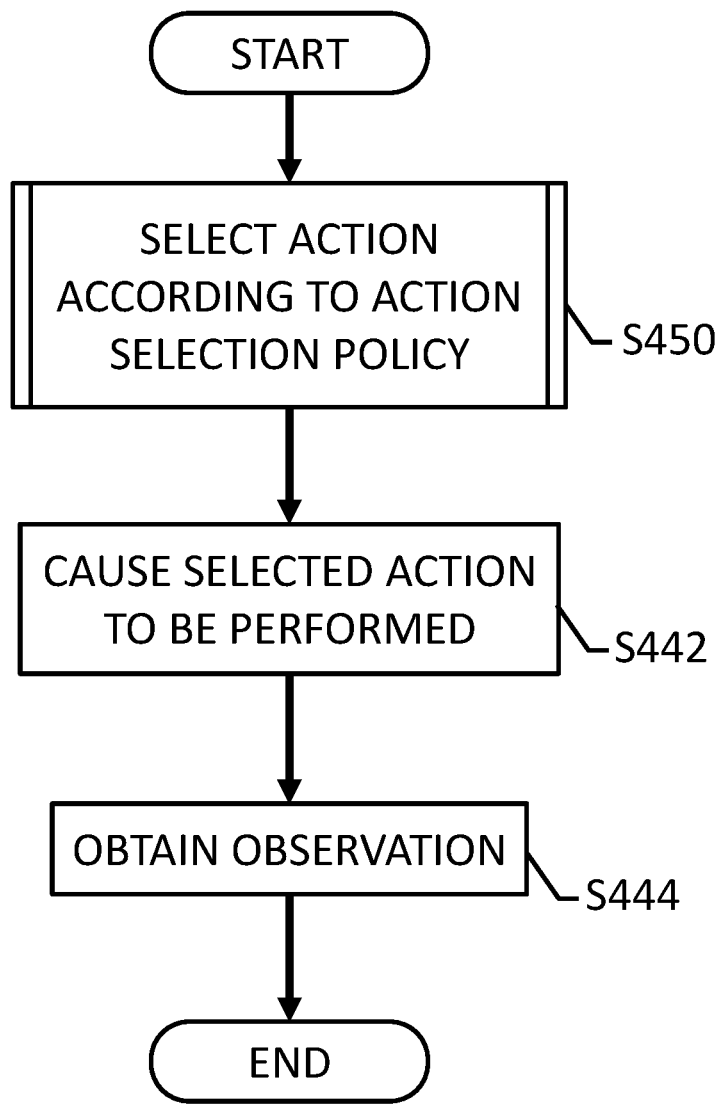
FIG. 4 shows an operational flow for inputting a time frame into a function approximator, according to an embodiment of the present invention.

FIG. 4 shows an operational flow for inputting a time frame into a function approximator, according to an embodiment of the present invention. The operational flow may provide a method of inputting a time frame into a function approximator, such as operation S340 in FIG. 3. The operations may be performed by an apparatus, such as apparatus 100.

At S450, a selecting section, such as selecting section 102, may select an action according to a probability function. For example, the selecting section may select an action according to an action selection policy with which to proceed from a current time frame of the action and observation sequence to a subsequent time frame of the action and observation sequence.

At S442, a causing section, such as causing section 104, may cause the selected action to be performed. For example, the causing section may cause the action selected at S450 to be performed in the subsequent time frame of the action and observation sequence. Depending on the nature of the action and observation sequence, actions may be caused through instructions or physical interaction, such as in the case of a human or machine, in which case the actions may be performed by the human or the machine, or caused by issuing commands to be executed by the computer program, in which case the actions are performed by the computer program.

At S444, the obtaining section may obtain an observation. For example, the obtaining section may obtain an observation of the subsequent time frame of the action and observation sequence. Once the selected action has been performed, certain observations can be sensed, detected, measured, or otherwise received by the obtaining section. The setting of reinforcement learning may be where a (Markovian) state cannot be observed (i.e., modeled as a partially observable Markov decision process or POMDP). If such a state was observable, an action selection policy that maps a state to an action could be sought, because the future would become conditionally independent of the past given the state. In a partially observable state setting, the optimal policy may depend on the entire history of prior observations and actions. In some embodiments, the observation obtained may also include or be accompanied by an actual reward, which may reduce the number of time frames needed for convergence, but may also need more computational resources. The actual reward may be supplied through conscious feedback, such as in indication by a person, or calculated from, for example, a final state, and is therefore assumed to be factual.

In embodiments of operational flow for inputting a time frame into a function approximator in which entire action and observation sequences are obtained at once, such as training sequences, the operational flow may not require a selecting operation or a causing operation, because the actions are already determined as part of the sequence. In further embodiments, such training sequences may be run through the operational flow multiple times and combined with different training sequences to train the function approximator.

Figure 5:
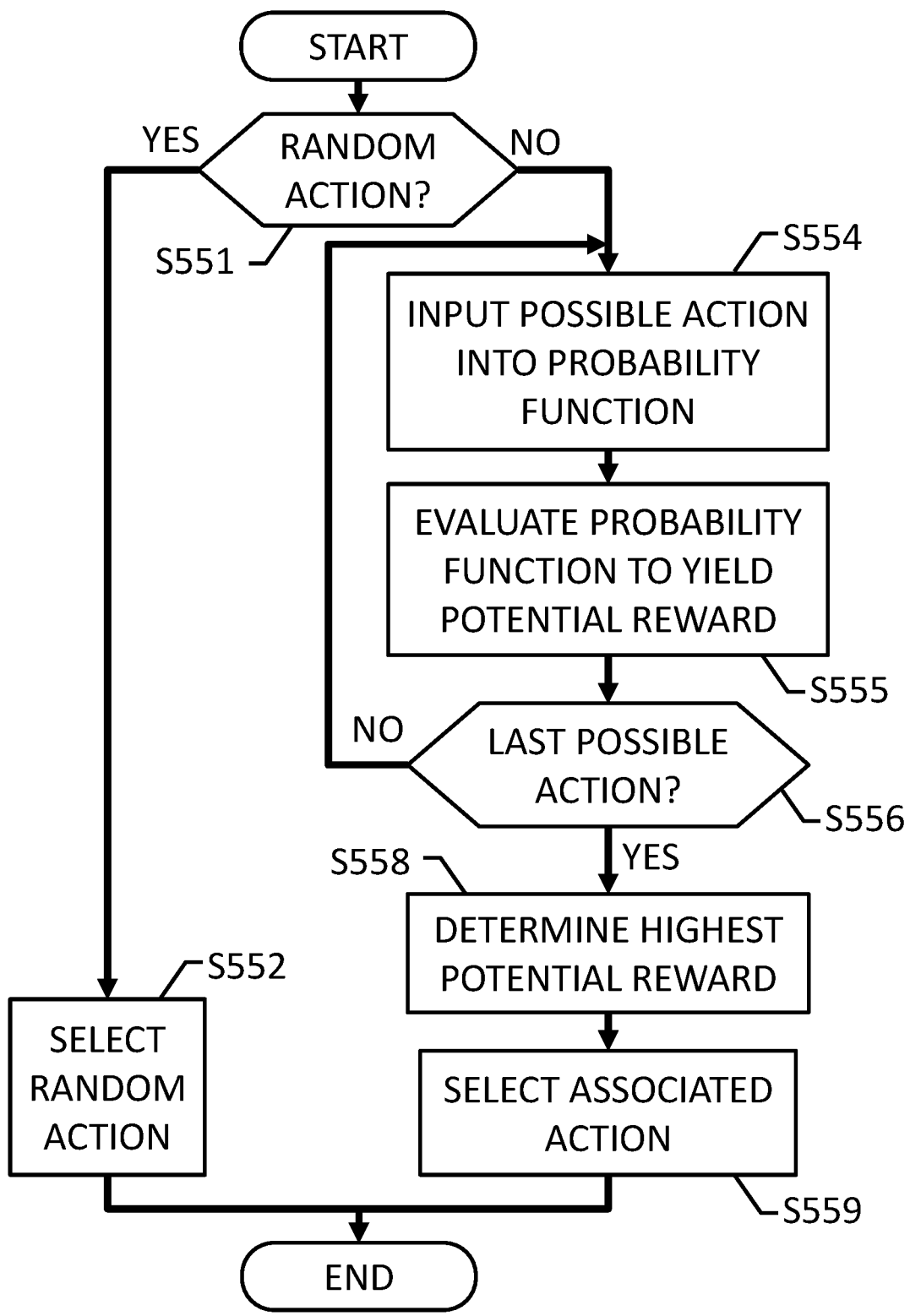
FIG. 5 shows an operational flow for selecting an action according to an action selection policy, according to an embodiment of the present invention.

FIG. 5 shows an operational flow for selecting an action, according to an embodiment of the present invention. The operational flow may provide a method of selecting an action according to a probability function or a random action, such as operation S450 in FIG. 4. The operations may be performed by an apparatus, such as apparatus 100.

At S551, a selecting section, such as selecting section 102, may determine whether to select a random action or an action according to a probability function. For example, the selecting section may select one of a random action and a greedy action, wherein the random action has a probability of being selected equal to an exploration term. In this embodiment, a random number is generated between 0 and 1. If the random number is greater than the exploration term, which is also a number between 0 and 1, then the operation proceeds to S554. If the random number is not greater than the exploration term, then the operation proceeds to S552.

At S552, the selecting section selects a random action. In other words, of all possible actions, one action is selected at the same rate of probability as every other possible action. Using the PACMAN™ example, in which movement in four directions are the possible actions, each direction is assigned an even range between 0 and 1, and another random number is generated between 0 and 1. If the random number is greater than 0.75, then the UP direction is performed. If the random number is greater than 0.5, but not greater than 0.75, then the RIGHT direction is performed. If the random number is greater than 0.25, but not greater than 0.5, then the DOWN direction is performed. If the random number is not greater than 0.25, then the LEFT direction is performed. Once the random action has been selected, the operational flow proceeds to cause the selected action, such as S442 in FIG. 4, to be performed.

At S554, the selecting section may input a possible action into a probability function. For example, out of all possible actions, a single possible action may be input into the probability function. Once the possible action is input into the probability function, the selecting section may make an indication, such as by updating a pointer, so that the same possible action is not input into the probability function twice in a single time frame.

At S555, a probability evaluating section, such as probability evaluating section 103, may evaluate the probability function to yield a reward probability, or the probability that a possible action will result in receiving a reward. As operations S554 and S555 are iteratively performed, the selecting section evaluates each reward probability of a plurality of possible actions according to the probability function based on the value function to select the greedy action.

At S556, the selecting section may determine whether any unevaluated possible actions remain. If the last possible action has not yet been evaluated, then the operational flow returns to S554. If the last possible action has been evaluated, then the operational flow proceeds to S558.

At S558, the selecting section may determine the highest reward probability that was yielded from the evaluations performed by the probability evaluating section at S555.

At S559, the selecting section may select the possible action that is associated with the highest reward probability determined at S558. In other words, the selected action among the plurality of possible actions yields the largest reward probability from the probability function. Once the possible action has been selected, the operational flow proceeds to cause the selected action, such as S442 in FIG. 4, to be performed.

Figure 6:
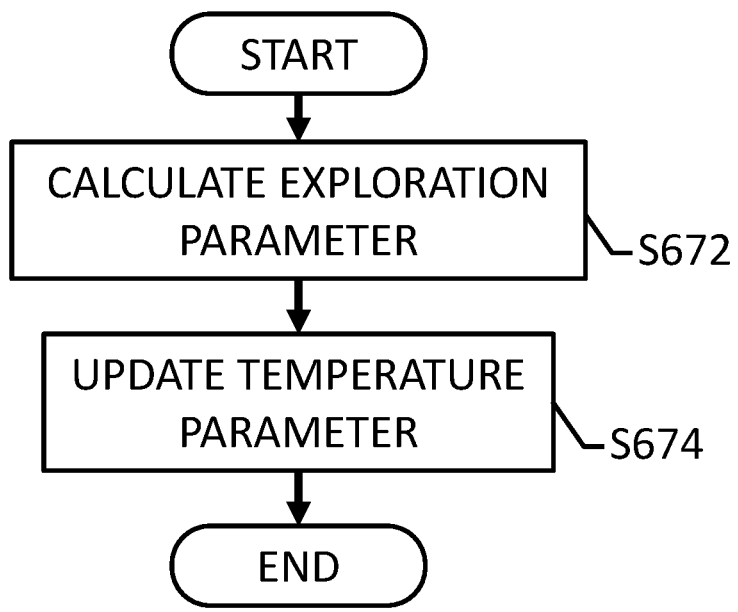
FIG. 6 shows an operational flow for updating an action selection policy, according to an embodiment of the present invention.

FIG. 6 shows an operational flow for updating an action selection policy, according to an embodiment of the present invention. The operational flow may provide a method of updating an action selection policy, such as operation S370 in FIG. 3. The operations may be performed by an apparatus, such as apparatus 100.

At S672, a calculating section, such as calculating section 110, may calculate an exploration term based on the current value and a temperature parameter. In some embodiments where the function approximator is a DQN, an exploration term based on a Boltzmann distribution that is dependent on an action-value function Q is adapted over time by deriving an exact gradient descent learning rule for the inverse temperature parameter of the Boltzmann distribution, according to:

$$\varepsilon(t)=\exp(-\beta Q(t)) \qquad \text{Eq. (2)}$$

Where Q(t) is the current time step neural network approximated action-value function, according to:

$$Q(t)=Q(s_t,a_t,\theta_t) \qquad \text{Eq. (3)}$$

And $s_t$, $a_t$, and $\theta_t$ are the currently visited state, actions and network parameters, respectively, and $\beta$ is the inverse temperature parameter.

At S674, a temperature updating section, such as temperature updating section 111, may update the temperature parameter using the exploration term and the current value. In some embodiments where the function approximator is a DQN, the temperature updating section may utilize a gradient rule for the inverse temperature parameter that minimizes the distance between the probability distribution of the exploration term and a fixed mean exponential distribution, which in turn may maximize the mutual information between the probability distribution of the action-value function Q and the probability distribution of exploration term:

$$\Delta\beta(t) = \eta_\beta \left[ \frac{1}{\beta(t)} + \mu Q(t)\varepsilon(t) \right] \qquad \text{Eq. (4)}$$

Where $\eta$ and $\mu$ are learning rates.

In this embodiment, the exploration term will not be updated with the latest temperature parameter until the next iteration. In other embodiments, these operations may be reversed and/or performed more than once to ensure that each iteration utilizes the latest parameters.

Figure 7:
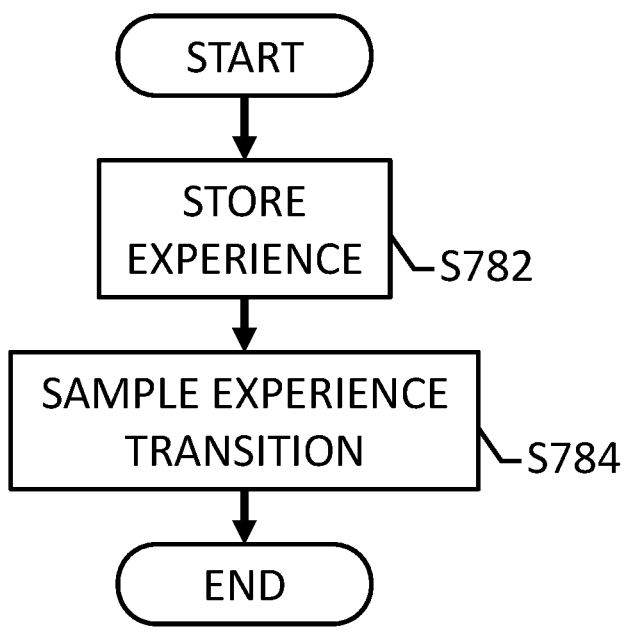
FIG. 7 shows an operational flow for updating the parameters of a function approximator, according to an embodiment of the present invention.

FIG. 7 shows an operational flow for updating the parameters of a function approximator, according to an embodiment of the present invention. The operational flow may provide a method of updating the parameters of a function approximator, such as operation S380 in FIG. 3. The operations may be performed by an apparatus, such as apparatus 100.

At S782, a storing section, such as storing section 114, may store at least one experience in a replay memory. Each experience may include action values, observation values, and reward values of a previous time frame and observation values of a current time frame. In some embodiments, an experience may be stored as <s, a, r, s'>, where s is the previously observed state and s' is the currently observed state.

At S784, a sampling section, such as sampling section 115, may sample at least one experience transition, each experience transition including two consecutive experiences. In some embodiments utilizing a DQN, a plurality of random experience transitions are sampled, each experience transition represented as <ss, aa, rr, ss'>. A parameter updating section, such as parameter updating section 113, may then calculate a target for each experience transition wherein if ss' is the terminal state, then tt=rr, otherwise:

$$tt = rr + \gamma \max_{a'} Q(ss', aa') \quad \text{Eq. (5)}$$

Where $\gamma$ is a learning rate, and tt is the TD error. The parameter updating section may further train the DQN using:

$$\text{Loss} = (tt - Q(ss, aa))^2 \quad \text{Eq. (6)}$$

Embodiments performing adaptive exploration in deep reinforcement learning may outperform state of the art DQNs performing exploration term annealing in challenges such as playing video games in which the images are the observations, and the input controls are the actions, as represented by a decision process, in both accuracy and speed (in terms of iterations). Embodiments performing adaptive exploration in deep reinforcement learning may shorten the time to converge to suitable action sequences that maximize the reward over time. Applications of such embodiments are not limited to video games, but may also include autonomous driving, finance, etc.

Figure 8:
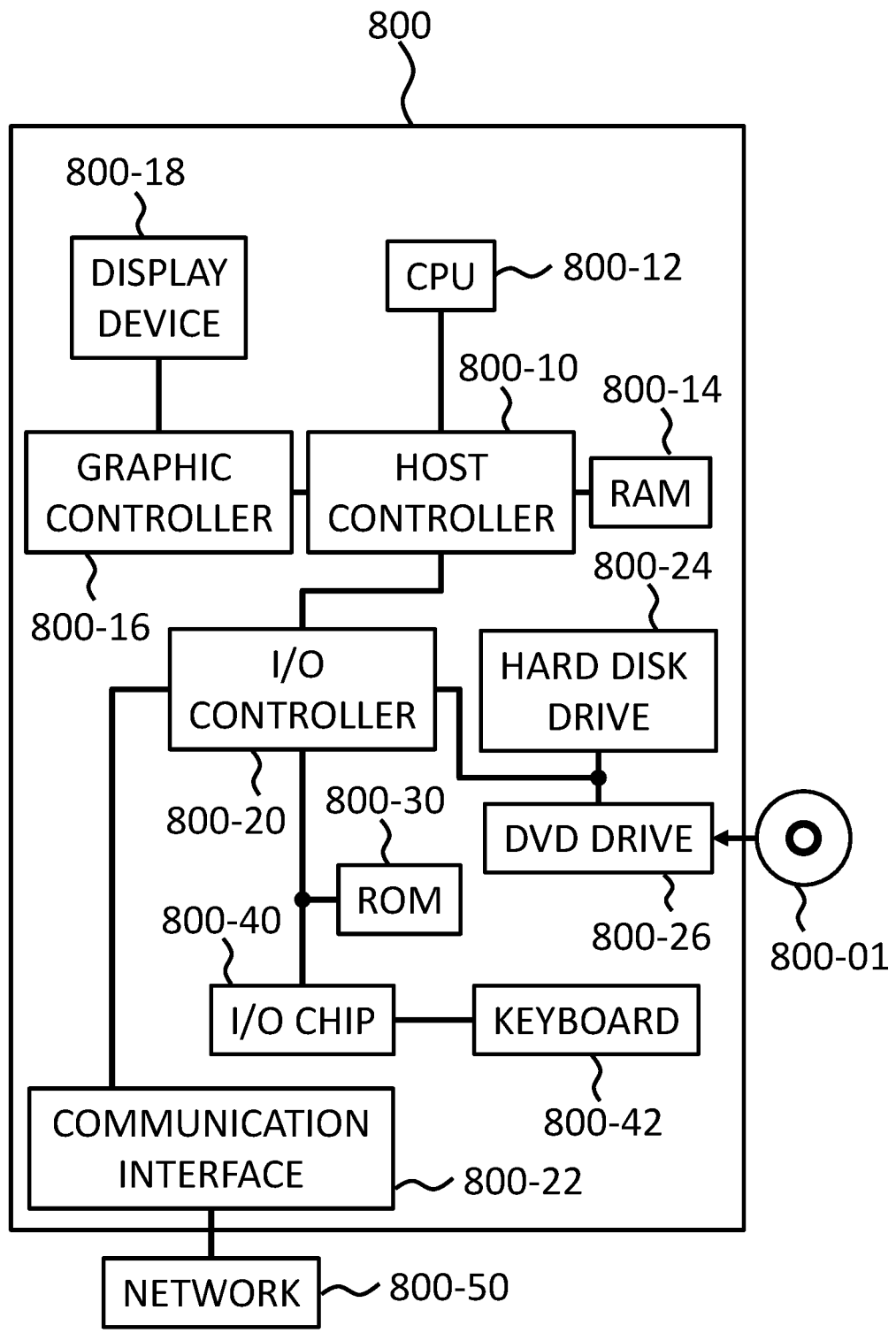
FIG. 8 shows an exemplary hardware configuration of a computer configured for adaptive exploration in deep reinforcement learning, according to an embodiment of the present invention.

FIG. 8 shows an exemplary hardware configuration of a computer configured for adaptive exploration in deep reinforcement learning, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800-

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer program product including one or more computer readable storage mediums collectively storing program instructions that are executable by a computer to cause the computer to perform operations comprising:
    performing reinforcement learning in an iterative process that includes:
        inputting a current time frame of an action and observation sequence sequentially into a neural network including a plurality of parameters, the action and observation sequence including a plurality of time frames, each time frame including action values and observation values;
        approximating a value function of the reinforcement learning using the neural network based on the current time frame to acquire a current reward value;
        updating an action selection policy through exploration based on an ε-greedy strategy using the current reward value, including calculating an exploration term ε based on the current reward value and a temperature parameter and updating the temperature parameter using a present value of the temperature parameter and a product of the exploration term and the current reward value; and
        training the neural network by updating the plurality of parameters to update the value function.

2. The computer program product of claim 1, wherein the value function is an action-value function.

3. The computer program product of claim 1, wherein the inputting of the current time frame includes:
    selecting an action according to the action selection policy with which to proceed from a current time frame of the action and observation sequence to a subsequent time frame of the action and observation sequence,
    causing the selected action to be performed, and
    obtaining an observation of the subsequent time frame of the action and observation sequence.

4. The computer program product of claim 3, wherein the selecting an action includes selecting one of a random action and a greedy action, wherein the random action has a probability of being selected equal to the exploration term.

5. The computer program product of claim 4, wherein
    the selecting of the greedy action includes evaluating each reward probability of a plurality of possible actions according to a probability function based on the value function, and
    the selected greedy action among the plurality of possible actions yields the largest reward probability from the probability function.

6. The computer program product of claim 1, wherein the approximating the value function includes acquiring the current reward value from an evaluation of the value function in consideration of an actual reward.

7. The computer program product of claim 1, wherein the updating the plurality of parameters includes
    storing at least one experience in a replay memory, each experience including action values, observation values, and reward values of a previous time frame and observation values of a current time frame, and
    sampling at least one experience transition, each experience transition including two consecutive experiences.

8. The computer program product of claim 1, wherein calculating the exploration term is performed as:

$$\varepsilon(t) = \exp(-\beta Q(t))$$

where Q(t) is the current reward value, t is a current time, and β is the temperature parameter.

9. The computer program product of claim 1, wherein updating the temperature parameter β(t) is performed as:

$$A\beta(t) = \eta_\beta [1/\beta(t) + \mu Q(t)\varepsilon(t)]$$

where $\eta_\beta$ and μ are learning rates, Q(t) is the current reward value, t is a current time, and ∈(t) is a current value of the exploration term.

10. A method comprising:
    performing reinforcement learning in an iterative process that includes:
        inputting a current time frame of an action and observation sequence sequentially into a neural network including a plurality of parameters, the action and observation sequence including a plurality of time frames, each time frame including action values and observation values;
        approximating a value function of the reinforcement learning using the neural network based on the current time frame to acquire a current reward value;
        updating an action selection policy through exploration based on an ε-greedy strategy using the current reward value, including calculating an exploration term ε based on the current reward value and a temperature parameter and updating the temperature parameter using a present value of the temperature parameter and a product of the exploration term and the current reward value; and
        training the neural network by updating the plurality of parameters to update the value function.

11. The method of claim 10, wherein the value function is an action-value function.

12. An apparatus comprising:
    a hardware processor; and
    a memory that stores a computer program product, which, when executed by the hardware processor, causes the hardware processor to:
        perform reinforcement learning in an iterative process, where by the hardware processor:
            inputs a current time frame of an action and observation sequence sequentially into a neural network including a plurality of parameters, the action and observation sequence including a plurality of time frames, each time frame including action values and observation values;
            approximates a value function of the reinforcement learning using the neural network based on the current time frame to acquire a current reward value;
            updates an action selection policy through exploration based on an ε-greedy strategy using the current reward value, including calculating an exploration term ε based on the current reward value and a temperature parameter and updating the temperature parameter using a present value of the temperature parameter and a product of the exploration term and the current reward value; and train the neural network with an update of the plurality of parameters to update the value function.

13. The apparatus of claim 12, wherein the value function is an action-value function.

* * * * *